Oct. 23, 1934.   J. E. MILLER   1,977,772
AUTOMATIC POSITION INDICATING SYSTEM
Filed June 18, 1930   3 Sheets-Sheet 1

INVENTOR.
John Edward Miller
BY
ATTORNEY.

Oct. 23, 1934.  J. E. MILLER  1,977,772
AUTOMATIC POSITION INDICATING SYSTEM
Filed June 18, 1930  3 Sheets-Sheet 2
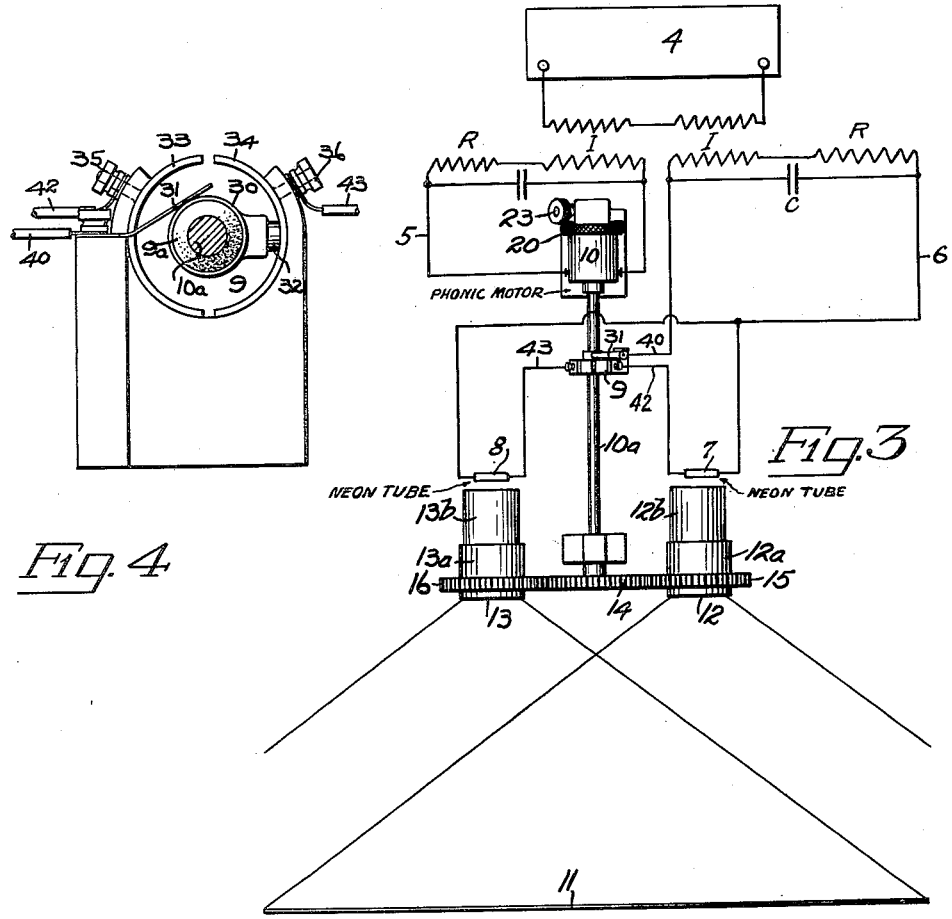
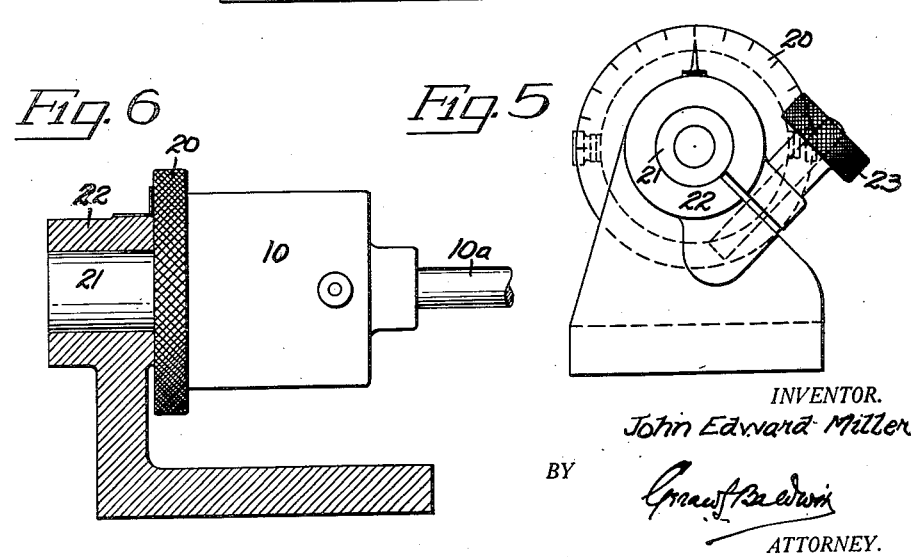
INVENTOR.
John Edward Miller
BY
ATTORNEY.

Oct. 23, 1934.  J. E. MILLER  1,977,772
AUTOMATIC POSITION INDICATING SYSTEM
Filed June 18, 1930   3 Sheets-Sheet 3
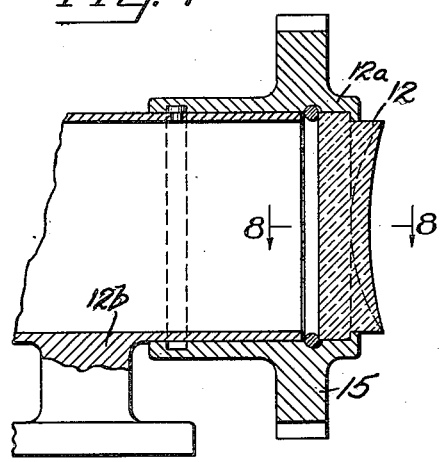
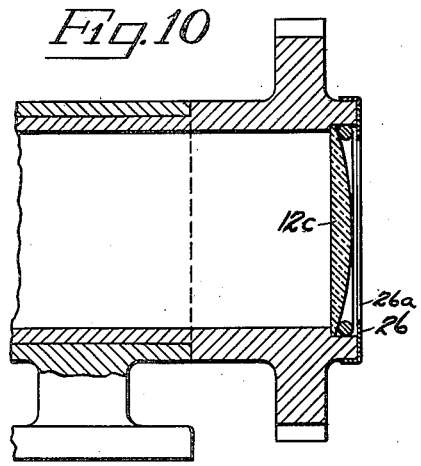
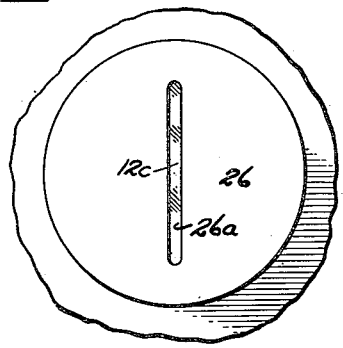
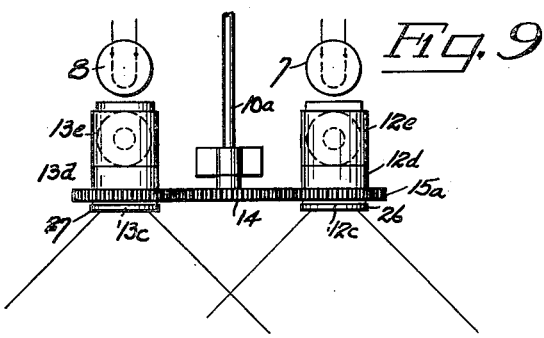
INVENTOR.
John Edward Miller
BY
Grant Baldwin
ATTORNEY.

Patented Oct. 23, 1934

1,977,772

UNITED STATES PATENT OFFICE 1,977,772

AUTOMATIC POSITION INDICATING SYSTEM

John Edward Miller, Detroit, Mich.

Application June 18, 1930, Serial No. 462,067

10 Claims. (Cl. 250—11)

This invention relates to improvements in automatic position indicating systems intended primarily for use on aircraft and vessels at sea.

It is an object of the invention to provide a position indicating system by which the position of a ship is constantly and automatically shown upon a map on the ship as soon as the latter comes within range of ground transmitters, and consists in the provision of two ground transmitters rotating at a relatively high speed each of which illuminates a tube or lamp placed adjacent a lens or lens and disc on a vessel; the lenses or lenses and discs are arranged to throw either shadows or light beams across the map at such frequent intervals that they appear to be there constantly. The point of intersection of the shadows or light beams on the map corresponds to the ship's location thereon.

Another object of the invention is to provide a position indicating system wherein a third and non-directional ground transmitter is employed to operate a motor by which the lenses or lenses and discs are rotated.

Other objects of the invention are: to provide means whereby the signals from all the ground transmitters are received by one receiver and separated so that they each perform their proper function; and to provide means for setting the lenses or discs so that the direction in which their shadows or light beams are thrown may be set relative to the broadcasting direction of the rotary transmitters by which the lamps or tubes under the lenses or discs are illuminated.

With these and other objects and advantages in view which will become apparent as the specification proceeds, the invention is hereinafter more fully described with the aid of the accompanying drawings, in which:

Figure 3 shows a diagrammatic plan view of the mechanism on the ship.

Figure 4 is an enlarged detail of a preferred form of switch.

Figures 5 and 6 are enlarged details showing mechanism by which a motor may be turned about its axis and held in any desired position.

Figures 7 and 8 show enlarged views of one form of lens arrangement by which a beam of light is thrown onto a map.

Figure 9 is a diagrammatic view of a slightly modified lens arrangement wherein slotted discs are arranged in front of the lenses, and Figures 10 and 11 are enlarged views showing the modified lens arrangement.

Figure 1:
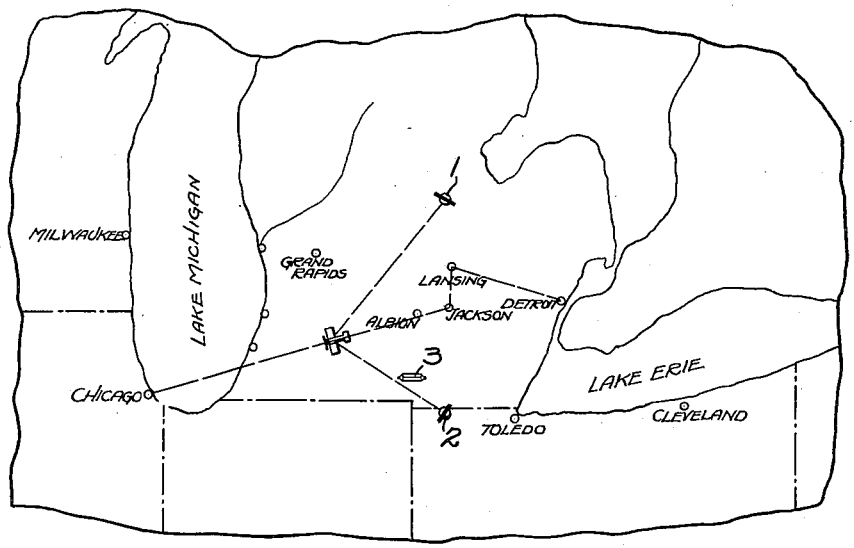
Figure 1 illustrates a ground plan of territory to be traversed on which the position of transmitters is indicated.

Referring to the drawings, on the ground plan shown in Figure 1, the ordinals 1 and 2 designate two rotary transmitters of any known type which may be such as described in "An Investigation of the Rotating Radio Beacon" by Smith-Rose and Chapman, published by the British Library of Information, 5 E. 45th Street, New York city, and having a speed of six or more revolutions per second installed at some little distance apart. The distance between these transmitters is subject to considerable variation. For instance when the purpose of the installation is to provide guidance at a landing field one transmitter may be erected on each side of the field; and in cases where it is desired to afford guidance over a course of one or two hundred miles or more the transmitters should be positioned considerably further apart.

The transmitters 1 and 2 broadcast on the same wave length and rotate in synchronism at a relatively high speed. Moreover I prefer that each transmitter broadcast alternately during one half of each revolution. A third and non-directional transmitter 3 is also erected usually near one of the transmitters 1 or 2. While the transmitter 3 may be of any conventional type the construction of the device itself must be varied to adapt it for use with different kinds of rotary transmitters.

When the transmitters 1 and 2 are of the loop type, signals from which are received at all times except for a few degrees when the loops are broadcasting at substantially 90° to a receiver, the transmitter 3, which is of any known design, operates continuously and at a slightly higher or lower frequency, and its frequency is modulated by a frequency that may be employed for operating a synchronous motor hereinafter referred to.

When the transmitters 1 and 2 are of the beam type, signals from which are only received for a few degrees when the beam is being broadcast substantially directly towards a receiver, the transmitter 3 as well as operating continuously at a slightly higher or lower frequency than the two rotary transmitters and having its frequency modulated by one that may be employed for operating a synchronous motor, is also modulated intermittently by a second frequency for quite short periods at regular intervals, for instance each time the rotary transmitter 1 is broadcasting in a northerly and southerly direction. The amount of the intermittent modulation is frequently and preferably equal to the beat frequency between the signals broadcast by the rotary and non-directional transmitters 1 and 3.

On the ship a receiver 4, of any preferred construction, is provided which delivers power from all the transmitters 1, 2 and 3 to filters 5 and 6. The filter 5 is responsive to the beat frequency between the rotary transmitters 1 and 2 and the non-directional transmitter 3. The output of the filter 5 is alternately connected to lamps or neon tubes 7 and 8 by a rotary switch 9 so that the signal from the transmitter 1 passes to the lamp or tube 7 and the signal from the transmitter 2 to the lamp or tube 8. And, when the second modulating frequency is intermittently broadcast by the transmitter 3 the signal passes to the lamp 7 through the switch 9.

The filter 6 is responsive to the modulating frequency carried by the non-directional transmitter 3, and operates a motor 10 which is adapted to be operated on alternating current of the same frequency as that by which the signal transmitted by the non-directional transmitter is modulated. The rotating portion 9a of the switch 9 is mounted on the shaft 10a of a phonic or impulse motor 10.

Referring more particularly to the construction shown in Figures 3, 7 and 8. Behind a translucent map 11 carried on the ship rotatable lenses 12 and 13 are supported in suitable annular housings 12a and 13a respectively. The map 11 may show all or any part of the territory within range of the transmitters 1, 2 and 3. I prefer, if possible, to locate the rotary transmitters 1 and 2 so that a base line connecting them is substantially at right angles to the usual travelled path of ships whose course these transmitters are intended to guide.

On the motor shaft 10a a gear 14 is secured which meshes with other gears 15 and 16 formed around the housings 12a and 13a respectively which are rotatable supported by bearings 12b and 13b. The gears 14, 15 and 16 must all have the same number of teeth so that both lenses rotate in synchronism with the motor shaft 10a, which, in turn, rotates in synchronism with the transmitters 1 and 2. Synchronism of the transmitters 1 and 2 and the motor 10 is, whenever possible, obtained by operating all the transmitters from the same power line and modulating the signal broadcast by the non-directional transmitter 3 by the frequency at which power is transmitted over the power line.

Figure 2:
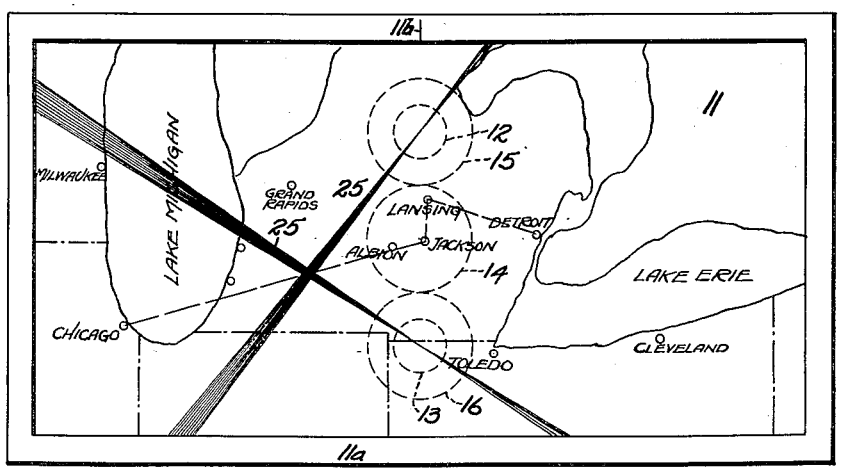
Figure 2 shows a map carried by the ship and a portion of the mechanism behind the map is also indicated; intersecting beams by which the ship's position on the map is indicated are also shown.

The lenses 12 and 13 are similarly ground so that they throw narrow diametral beams of light from the lamps or tubes 7 and 8 respectively onto the map 11. The length of the beams thrown is usually sufficient to extend completely across the map in any direction. As will be noted from Figure 2 the lenses 12 and 13 are so positioned that their axes are immediately behind the places on the map 11 at which the rotary transmitters 1 and 2 respectively are actually located. The rotation of the lenses 12 and 13 is so timed that their diametral beams are always maintained at 90° to the broadcasting direction of the rotary transmitters 1 and 2 which illuminate the lamps or tubes under the said lenses. This relative setting of the lenses with regard to the broadcasting direction of the transmitters 1 and 2 is obtained in a manner hereinafter described.

The lamps 7 and 8 are illuminated alternately during substantially one half of each revolution of the lenses 12 and 13 except during the comparatively short period when the sending direction of the transmitters 1 and 2 is substantially at right angles to the receiver 4. And, due to the 90° advance of the light beams thrown by the lenses, the few degrees through which the lenses turn while no light is thrown by them against the map occurs, when the beams, if thrown, would be directly in line with the direction of the ship from the transmitters 1 and 2. As the axes of both light beams corresponds with the locations on the map of the transmitters 1 and 2 the intersection of the dark lines or shadows a few degrees in which, indicated on the map shown in Figure 2 by the numeral 25, which apparently remains constant on the map due to the high speed of rotation of the lenses, designates the ship's position.

In order to set the motor 10 and the lenses 12 and 13 so that the light beams thrown by the latter are always at right angles to the direction of broadcast of the rotary transmitters, the signal broadcast by the transmitter 1 is interrupted for say one degree when that transmitter is broadcasting at right angles to the second rotary transmitter 2. That is when the lamp or tube 7 is usually being fairly brightly illuminated, and when the beam thrown by the lens 12 lies in the present instance, vertically on the map 11. On the margin 11a of the map an indicating mark 11b is shown with which the light beam thrown by the lens 12 would be in alignment if the current were not interrupted. So if the narrow shadow caused by the signal interruption lies in alignment with the indicating mark 11b the lenses are turning in synchronism with the transmitters 1 and 2; but if this does not occur adjustment is made in the following manner.

Referring now to Figures 5 and 6. Around the motor 10 a collar 20 is secured which has an outwardly projecting sleeve 21 integral with it. The latter is in axial alignment with the motor shaft 10a, and is supported in a split bearing 22 so that the motor may be turned about its axis while running. 23 denotes a clamping screw for tightening the bearing 22 and holding the sleeve 21 against accidental rotation relative thereto. By loosening the screw 23 the motor 10 may be turned about the axis of its shaft 10a until the narrow shadow above referred to registers with the indicating mark 11b.

Figures 9, 10 and 11 show a modified arrangement which may be employed when the transmitters 1 and 2 are of the beam type. The lenses 12c and 13c are so ground as to throw light conically, and are supported in housings 12d and 13d respectively integral with which are gears 15a and 16a. The latter are driven by the gear 14 on the shaft 10a. The housings 12d and 13d are rotatable in bearings 12e and 13e. Discs 26 and 27 having narrow diametral slots therein, as shown at 26a in Figure 11, are secured to the fronts of the housings 12d and 13d respectively so as to rotate with them. The housings are positioned similarly to the housings 12a and 13a relative both to the lamps or tubes 7 and 8 and also to the map 11. And the lamps 7 and 8, the lenses 12c and 13c and the discs 26 and 27 are so positioned that the axes of the light beams thrown by the lenses 12c and 13c through the slotted discs 26 and 27 register on the map 11 with the actual locations thereon of the rotary transmitters 1 and 2 by which the said lamps are illuminated. In this case, however, the discs 26 and 27 are so arranged that the beams of light passing through their diametral slots synchronize with the broadcasting direction of the rotary transmitters 1 and 2. As the lamps 7 and 8 are only lit in this case when the transmitters 1 and 2 broadcast substantially directly towards the receiver 4 only relatively narrow paths of light appear on the map which intersect again as shown at 25 except that a lighted intersection becomes visible in this case instead of intersecting shadows. And obviously the point of intersection of the two beams forms a more brightly illuminated slot which is clearly visible.

In this case synchronization of the rotary discs 26 and 27 with the rotary transmitters 1 and 2 is effected in a manner similar to that already described, except that the light that should register with the indicating mark 11b is furnished by the intermittent modulating signal broadcast by the transmitter 3.

The switch shown in Figure 4 and which may be employed on the motor shaft 10a for alternately connecting the transmitters' signals with the lamps 7 and 8. A lead 40 from the filter 5 is connected to a contact 31 which wipes a rotor 30 mounted on the shaft 10a. Integral with the said rotor is an arm 32 which alternately bears against one of the substantially semi-circular contacts 33 and 34 from which terminals 35 and 36 respectively project. Leads 42 and 43 from the latter are run to the lamps 7 and 8.

While in the foregoing the preferred embodiments of the invention have been described and shown, it is understood that these constructions are susceptible to such further alterations and modifications as fall within the scope of the appended claims.

What I claim as my invention and desire to secure by Letters Patent is:

1. An automatic position indicating system comprising two rotary directional transmitters spaced from one another and erected at fixed points, a vessel, means on said vessel for receiving signals broadcast by the rotary transmitters, a map on said vessel, lamps on said vessel one complemental to each transmitter, means for illuminating each lamp intermittently by the signal broadcast by its complemental transmitter when that transmitter is broadcasting substantially in the direction of said vessel, a rotary element interposed between each lamp and the map and having its axis passing through the point upon the map which designates the location thereon of the directional transmitter complemental to the lamp behind that element, the intermittent illumination of said lamps behind said rotary transmitters being adapted to cause visible rotary strips to appear upon and extend across said map and the intersection of the strips upon the map designating the vessel's position thereon, and means for turning the elements at the same speed as that of the rotary transmitters.

2. An automatic position indicating system comprising two rotary directional transmitters spaced from one another and erected at fixed points, a vessel, means on said vessel for receiving signals broadcast by the rotary transmitters, a map on said vessel, lamps on said vessel one complemental to each transmitter, means for illuminating each lamp intermittently by the signal broadcast by its complemental transmitter when that transmitter is broadcasting substantially in the direction of said vessel, a rotary element interposed between each lamp and the map and having its axis in alignment with the point upon the map which designates the location thereon of the directional transmitter complemental to the lamp behind said element, the intermittent illumination of said lamps behind the rotary elements being adapted to cause visible rotary strips to appear upon and extend across said map, means for turning the elements at the same speed as that of the rotary transmitters, and means for setting the elements rotatably relative to the broadcasting direction of the transmitters so that the intersection of the strips upon the map designates the vessel's position thereon.

3. An automatic position indicating system comprising two rotary directional transmitters spaced from one another and erected at fixed points, a vessel, means on said vessel for receiving signals broadcast by the rotary transmitters, a map on said vessel, lamps on said vessel one complemental to each transmitter, means for illuminating each lamp intermittently by the signal broadcast by its complemental transmitter when that transmitter is broadcasting substantially in the direction of said vessel, a lens interposed between each lamp and the map through which a beam is thrown onto the map and extends across it, said lenses having their axes coincident with the locations upon the map of the transmitters complemental to the lamps behind said lenses so that the intersection of the beams upon the map designating the vessel's position thereon, means for setting the lenses rotatably relative to the direction of the rotary transmitters, and means for turning the lenses at the same speed as that of the rotary transmitters.

4. An automatic position indicating system comprising two rotary directional transmitters spaced from one another and erected at fixed points, a vessel, means on said vessel for receiving signals broadcast by the rotary transmitters, a map on said vessel, lamps on said vessel one complemental to each transmitter, means for illuminating each lamp intermittently by the signal broadcast by its complemental transmitter, a diametrically slotted opaque disc interposed between each lamp and the map through which a beam of light is thrown onto the map and extends across it, said slotted discs having their axes coincident with the locations upon the map of the transmitters complemental to the lamps behind said discs so that the intersection of said light beams upon the map designating the vessel's position thereon, means for setting the discs rotatably relative to the broadcasting direction of the rotary transmitter, and means for turning the discs at the same speed as that of the rotary transmitters.

5. An automatic position indicating system comprising two rotary directional transmitters spaced from one another and one non-directional transmitter all erected at fixed points, a vessel, means on the vessel for receiving signals broadcast by the transmitters, a map on the vessel, lamps on the vessel one complemental to each rotary transmitter, means for illuminating each lamp intermittently by the signal broadcast by its complemental rotary transmitter when that transmitter is broadcasting substantially in the direction of said vessel, a rotary element interposed between each lamp and the map through which visible rotary strips caused by the intermittently illuminated lamps are made to appear upon the map and extend across it, said elements having their axes coincident with the location on the map of the rotary transmitters complemental to the lamps behind said elements, means for turning the elements at the same speed as that of the rotary transmitters by the signal broadcast by the non-directional transmitter, and means for setting the elements rotatably relative to the broadcasting direction of the rotary transmitters so that the intersection of the strips appearing upon the map designates the vessel's position thereon.

6. An automatic position indicating system comprising two rotary directional transmitters spaced from one another and one non-directional transmitter all erected at fixed points, a vessel, means on the vessel for receiving signals broadcast by all the transmitters, a map on the vessel, lamps on the vessel one complemental to each rotary transmitter, means for illuminating each lamp intermittently by the signal broadcast by its complemental transmitter when that transmitter is broadcasting substantially in the direction of said vessel, a rotary lens interposed between each lamp and the map through which a beam is thrown onto the map and extends across it, means for turning the lenses at the same speed as that of the rotary transmitters by the signal broadcast by the non-directional transmitter, said lenses having their axes coincident with the locations upon the map of the rotary transmitters complemental to the lamps behind said lenses, and means for setting the lenses rotatably relative to the direction of the rotary transmitters complemental to the lamps behind said lenses so that the intersection of the beams upon the map designates the vessel's position thereon.

7. An automatic position indicating system comprising two rotary directional transmitters spaced from one another and one non-directional transmitter all erected at fixed points, a vessel, means on the vessel for receiving signals broadcast by the transmitters, a map on the vessel, lamps on the vessel one complemental to each directional transmitter, means for illuminating each lamp intermittently by the signal broadcast by its complemental transmitter when that transmitter is broadcasting substantially in the direction of said vessel, a slotted opaque disc interposed between each lamp and the map through which a beam of light is thrown intermittently by the lamp behind it onto the map, means for rotating the discs at the same speed as that of the directional transmitters by the signal broadcast by the non-directional transmitter, the axes of said discs coinciding with the locations upon the map of the transmitters complemental to the lamps behind said discs, and means for setting the discs rotatably relative to the rotary transmitters so that the intersection of the light beams upon the map designates the vessel's position thereon.

8. An automatic position indicating system comprising two rotary transmitters spaced from one another and erected at fixed points, a vessel, means thereon for receiving signals broadcast by the transmitters, a map on said vessel, lamps on said vessel one complemental to each transmitter, means for illuminating each lamp intermittently by the signal broadcast by the transmitter complemental to it, said lamps being unilluminated during the periods that their complemental transmitters are broadcasting substantially at 90° to them, a rotary element interposed between each lamp and the map through which narrow rotary shadows caused by the intermittent lack of illumination of the lamps are made to appear upon the map and extend across it, means for rotating the elements at the same speed as that of the rotary transmitters, said elements having their axes coinciding with the location upon the map of the transmitters complemental to the lamps behind said elements, the latter being rotatably set at 90° to the broadcasting direction of the transmitters, and means for effecting such setting so that the narrow shadow strips appearing upon the map intersect thereon, the intersection designating the vessel's location upon said map.

9. An automatic position indicating system comprising two rotary directional transmitters spaced from one another and a non-directional transmitter, all erected at fixed points, a vessel, means thereon for receiving signals broadcast by all the transmitters, a map on said vessel, lamps on said vessel, one complemental to each directional transmitter, means for illuminating each lamp intermittently by the signal broadcast by the transmitter complemental to it, said lamps being unlit during the periods when their complemental transmitters are broadcasting at substantially 90° to the vessel's position, a lens interposed between each lamp and the map through which narrow rotating shadow strips caused by the intermittent lack of illumination of the lamps are caused to appear upon and extend across said map, means for turning the lenses at the same speed as that of the rotary transmitters by the signal broadcast by the non-directional transmitter, said lenses being adapted to be set so that the direction of the shadow strips across the map is disposed at 90° to the broadcasting direction of the transmitters complemental to the lamps behind said lenses, and means for effecting such setting so that the narrow shadow strips intersect upon the map, the intersection designating the vessel's position.

10. An automatic position indicating system as set forth in claim 2 wherein the means for setting the elements rotatably relative to the broadcasting direction of the transmitters consists of interrupting the broadcast of these transmitters when they are broadcasting in a predetermined direction thereby causing shadows to appear upon the map which should synchronize with lines provided thereon and drawn radially from the location of the transmitters thereon, and means for rotatably setting the elements if such synchronization does not occur.

JOHN EDWARD MILLER.